(12) United States Patent
Kamalizad et al.

(10) Patent No.: US 9,479,379 B2
(45) Date of Patent: Oct. 25, 2016

(54) NARROWBAND OFDM (NOFDM) TRANSCEIVER FOR POWERLINE COMMUNICATIONS (PLC)

(71) Applicant: Semitech Semiconductor Pty., Kensington, VIC (AU)

(72) Inventors: Amir H. Kamalizad, Irvine, CA (US); Zeev Collin, Tustin, CA (US)

(73) Assignee: Semitech Semiconductor Pty Ltd., Kensington (AU)

( * ) Notice: Subject to any disclaimer, the term of this patent is extended or adjusted under 35 U.S.C. 154(b) by 0 days.

(21) Appl. No.: 14/102,417

(22) Filed: Dec. 10, 2013

(65) Prior Publication Data
US 2015/0162970 A1  Jun. 11, 2015

(51) Int. Cl.
| | |
|---|---|
| *H04B 3/54* | (2006.01) |
| *H04B 7/08* | (2006.01) |
| *H04B 7/12* | (2006.01) |
| *H04L 5/00* | (2006.01) |
| *H04L 27/26* | (2006.01) |
| *H04B 3/56* | (2006.01) |
| *H04B 1/69* | (2011.01) |

(52) U.S. Cl.
CPC ............. *H04L 27/2655* (2013.01); *H04B 3/54* (2013.01); *H04B 3/56* (2013.01); *H04L 27/2613* (2013.01); *H04B 2001/6912* (2013.01); *H04B 2203/5491* (2013.01); *H04L 5/0044* (2013.01)

(58) Field of Classification Search
CPC ............. H04B 1/38; H04B 1/40; H04B 1/41; H04B 3/00; H04B 3/02; H04B 3/50; H04B 3/52; H04B 3/54; H04B 3/546; H04B 3/56; H04B 3/60; H04B 7/0868; H04B 7/12; H04B 2203/5462; H04B 2203/5491; H04L 5/003; H04L 5/0044; H04L 5/0046; H04L 27/2601; H04L 27/2626; H04L 27/2627; H04L 27/2628; H04L 27/263; H04L 27/265; H04L 27/2655; H04L 27/2613
USPC ........ 375/219, 220, 222, 257, 259–265, 267; 370/208, 210
See application file for complete search history.

(56) References Cited

U.S. PATENT DOCUMENTS

| | | | |
|---|---|---|---|
| 6,040,759 A | 3/2000 | Sanderson | |
| 6,885,674 B2 | 4/2005 | Hunt | |
| 7,746,763 B2 | 6/2010 | Fruhauf | |
| 2009/0225880 A1* | 9/2009 | Lin et al. | ...................... 375/260 |
| 2010/0031107 A1* | 2/2010 | Bu et al. | ....................... 714/748 |
| 2012/0269234 A1* | 10/2012 | Zhang et al. | ................ 375/143 |
| 2013/0094552 A1 | 4/2013 | Vendantham | |
| 2014/0112398 A1* | 4/2014 | Kamalizad et al. | .......... 375/257 |

OTHER PUBLICATIONS

OFDM-Based High-Speed Narrowband PLC Approved for Smart Metering and Smart Grids, Arivus, Apr. 2009, pp. 1-35.
Jim Leclare, Overcoming Smart Grid Communication Challenges with orthogonal Frequency Division Multiplexing (OFDM) and IEEE 1901.2, May 1, 2012, pp. 1-7, USA.

(Continued)

*Primary Examiner* — Young T Tse
(74) *Attorney, Agent, or Firm* — Henry J. Cittone; Cittone & Chinta LLP

(57) ABSTRACT

The present invention provides a narrowband OFDM (NOFDM) system with frequency diversity redundant transmission and receiver diversity selection and combining scheme. The communication channel is segmented into independent plurality of sub-channels. The sub-channels can be used in an aggregated mode to transmit different data on every sub-channel or in a number of redundant modes, where the same data is sent on multiple sub-channels to achieve maximum robustness of communication. Redundant modes may include channel selection diversity and/or weighted channel combining diversity.

18 Claims, 5 Drawing Sheets

(56) References Cited

OTHER PUBLICATIONS

Adermi A. Atayero, Adeyemi A. Alatishe, Yury A. Ivanov, Power Line Communication Technologies: Modeling and Simulation of PRIME Physical Layer, Oct. 24-26, 2012, pp. 1-6, USA.

Bogdan Baraboi, Narrowband Powerline Communication Application, and Challenges, Mar. 10, 2013, pp. 1-12, Canada.

Jim Leclare, Afshin Niktash, Victor Levi, An Overview, History, and Formation of IEEE P1901.2 for Narrowband OFDM PLC, Jul. 2, 2013, pp. 1-7, USA.

\* cited by examiner

NARROWBAND OFDM (NOFDM) TRANSCEIVER FOR POWERLINE COMMUNICATIONS (PLC)

FIELD OF THE INVENTION

The invention generally relates to Power Line Communications (PLC), and more particularly a transceiver implemented for PLC and applicable to any other medium.

BACKGROUND

Orthogonal frequency-division multiplexing (OFDM) is a modulation scheme where data is encoded in multiple carrier frequencies. For years OFDM has been getting a lot of attention for wireless and wired communications because of its high spectral efficiency and its ability to combat ISI and channel delay with the addition of guard interval and cyclic prefix. Recently, OFDM has gained a lot of attention in powerline communications, particularly in the sub 500 kHz frequency band. There are many emerging standards for communicating over the available alternating current and direct current power lines using the low frequency band of less than 500 kHz. These emerging standards find their applications in Automatic Meter Reading (AMR), Advanced Metering Infrastructure (AMI), Solar Panels, Electric Vehicle charging stations and other industrial monitoring and control applications. Particularly, in US, Japan and Asia, the existing regulations pave the way for transmission across all the frequency band around 500 KHz. Moreover, in metering application, there is a requirement to be able to cross Medium Voltage (MV) transformer in the case of isolated meters. Isolated meters are in rural and sparsely populated areas where only a few meters, are connected to MV transformer and in order for PLC to be economically viable crossing a transformer is a requirement. The channel analysis performed in US shows that there are many channels where only a very narrow portion of the channel is available for communications. The same channel behavior has been observed in Japan and China. Specifically, in cases where only a narrow portion of the channel has good SINR (signal to interference and noise ratio), the synchronization is very difficult or even impossible, since usually a wideband time domain signal is used as a preamble.

In view of the aforementioned limitations, the present invention provides an effective way of digital communication over powerline and other media on channels where only small part(s) of the channel are suitable for communication, while still taking advantage of the OFDM modulation scheme.

BRIEF SUMMARY OF THE INVENTION

The invention discloses a NOFDM (Narrowband OFDM) system for Powerline and other media of communications where bandwidth is divided into a plurality of narrowband sub-channels. Each sub-channel is independent of other sub-channels and data can be transmitted in different redundancy to have a bit-rate vs. frequency diversity tradeoff.

The narrowband sub-channels have separate preambles and separate headers. The sub-channels are equivalent to multiple transmitters and receivers. The use of no redundancy and aggregating the sub-channels in good channel conditions result in achieving higher data rates. In no redundancy or aggregate mode different data are transmitted over the different sub-channels. In contrast the use of redundancy across the sub-channels, where same data are transmitted over the sub-channels, results in more robust communication in harsh channel conditions. At the receiver's end a single synchronizer is used in diversity selection scheme and only one sub-channel is demodulated at the time, or a multitude of synchronizers are used, so a multitude of sub-channels partially or fully demodulated and diversity combining scheme is employed to extract the data.

The system finds its application in powerline communication where only a portion of channel has good SINR (signal to interference and noise ratio), and the synchronization is difficult since a wideband time domain signal is used as a preamble.

In one of the embodiments of the present invention four band pass filters and synchronizers are used, so the chances of detecting packets are increased significantly.

The same approach is not limited to the powerline medium, but can be used on other media employing OFDM modulations, such as wireless.

DETAILED DESCRIPTION OF THE EMBODIMENTS

Figure 1:
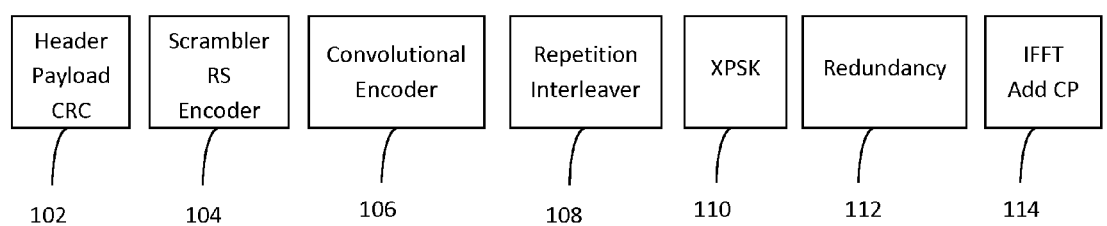
FIG. 1 shows a physical layer in a NOFDM transmission in accordance with an embodiment of the present invention.

In the following detailed description of embodiments of the invention, numerous specific details are set forth in order to provide a thorough understanding of the embodiment of the invention. However, it will be obvious to a person skilled in the art that the embodiments of invention may be practiced with or without these specific details. In other instances, well known methods, procedures and components have not been described in details so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

The present invention discloses a system and method associated with Narrowband OFDM (NOFDM) with frequency diversity redundant or aggregated transmission and receiver diversity selection and combining scheme. The NOFDM system is applied to power line communications, where the bandwidth of the channel is segmented into completely independent narrow sub-channels. Each of the sub-channels has a sub-carrier frequency region; the data to be transmitted is encoded on the sub-carrier frequency region and is then transmitted through the sub-channels. The sub-channels can be used in an aggregated mode to transmit different data on every sub-channel or in a number of redundant modes. In the redundant mode, the same data is sent on multiple sub-channels to achieve maximum robustness of communication. In redundancy mode, maximum ratio combining can be performed by each demodulated sub carrier on the receiving end. The whole system is equivalent to having multiple OFDM transmitters and receivers operating concurrently across multiple frequency regions (sub-channels) of the communication channel using these sub-channels in aggregated or redundant modes. Redundant modes may include channel selection diversity and/or weighted channel combining diversity. Different metrics can be used to derive decision making on the combining (such as sub channel RSSI (received signal strength indicator), subchannel SINR, subchannel synchronizer correlation score, or any other channel quality metric). When in redundancy mode, the implementation can be greatly simplified when all sub-channels are transmitted using the same initial phase.

One of the embodiments the present invention discloses a physical layer to be used in NOFDM transmission that is an extension of IEEE 1901.2 standard and can be used with IEEE 1901.2 MAC layer.

The NOFDM system is based on the OFDM modulation scheme which can be implemented in PLC (power line communication) within sub 500 kHz region. The 500 kHz channel is divided into a plurality of sub-channels such that each of the sub-channels can be used to transmit the signals independent of other signals in the other sub-channels. The multiple sub-channels are typically 50-100 kHz wide, but can be of any range, and are completely independent. The independent sub-channels are equivalent to transmitter and receiver.

The OFDM specifications for PHY (physical) layers are FFT size 256 or 512, same FEC (forward error correction) i.e. concatenated Reed Solomon and Convolutional coding, interleaver and packet format as the MAC (medium access control) layer and are an augmented IEEE 1901.2 physical layer with added Redundancy scheme. The NOFDM PHY layer performs well in harsh power line channels where in most cases only a small part of sub 500 kHz region has good SNR (signal to noise ratio).

The system and method can be implemented with different modes such as: (a) aggregation mode, where all sub-channels carry different data, so the data rate is maximized, while using only viable portions of the spectrum; (b) channel selection diversity redundancy mode, where the same data is transmitted on multiple sub-channels and only one sub-channel is being demodulated by the receiver; (c) channel combining diversity redundancy mode, where the receiver partially or fully demodulates all channels to perform simple receive diversity and maximum ratio combining to combine the information from multiple channels (on a sample by sample or symbol by symbol basis) to maximize the ability to receive the transmitted data. Different metrics can be used to derive decision making on the combining Different channels can be assigned different weights in the process of combining. The various modes enable trade-off between higher data rate and robustness depending on channel conditions and the complexity of the receiver. The scheme can operate in a "mixed mode" where some sub-channels are redundant, while others are aggregated.

In one embodiment of the present invention, in redundancy mode, the sub-channels have same initial phase. The initial phase is used in the preamble and the header. Having identical initial phase across the sub-channels greatly simplifies implementation.

In another embodiment of the present invention, in aggregate or cluster mode of NOFDM data transmission, the sub-channels have different initial phases, i.e. each sub-channel has different preamble and headers.

FIG. 1 shows a physical layer in a NOFDM transmission in accordance with an embodiment of the present invention. On the transmitter side, the PHY layer receives the header and payload 102 from the MAC layer. If an implementation requires CRC8 or CRC16, zero padding needs to be performed before processing the block of data. Scrambler 104 randomizes the data to achieve more uniform power distribution. Standard scrambles 104, a convolutional encoder 106 with rate 1/2 and constraint length of 7 with octal polynomials of 133 and 171 with repetition coding is used for the header. Payload uses concatenation of the aforementioned convolutional coding with the Reed Solomon code RS (255,239) and RS (255,247). A frame wide block interleaving 108 is then used to combat impulsive noise in the channel. The output then is modulated by using BPSK (binary phase shift key), QPSK (quadrature phase shift keying) or 8PSK (8 phase shift keying) 110 with possible repetition coding in BPSK being used here to trade off rate with coding gain. In the next step the redundancy scheme 112 is added. This redundancy is added in the form of sub-channel redundancy and up to but not limited to 4× redundancy is supported. The 4× redundancy can be depicted as four independent completely functional modems. This redundancy scheme is equivalent to having multiple transmitters and receivers. The next step is OFDM (orthogonal frequency division multiplexing) which comprises IFFT (inverse fast Fourier transform) 114 blocks with cyclic prefix generator. In an embodiment, the above elements may be implemented by hardware, software, firmware, or any combination of hardware, software, and firmware.

The system parameters include but are not limited to the physical layer, data packet format, modulation schemes, operating modes.

The main change compared to the IEEE 1901.2 standard is the addition of the redundancy block 112. This redundancy (redundancy block 112) is added in the form of sub-channel redundancy and up to but not limited to 4× redundancy have to be supported.

In an embodiment of the present invention, the physical layer in NOFDM can be used for transmitting signal in an aggregated or in one of the redundant schemes.

Figure 2:
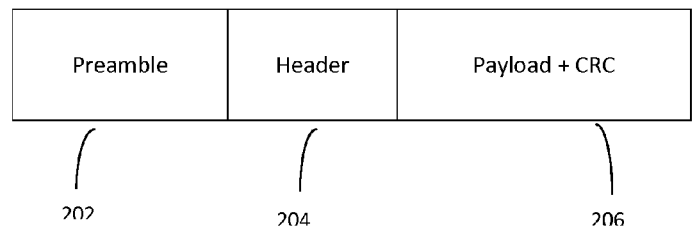
FIG. 2 shows a NOFDM physical packet format in accordance with an embodiment of the present invention.

FIG. 2 shows a NOFDM physical packet format in accordance with an embodiment of the present invention. Preamble 202 is a chirp signal used for AGC (automatic gain control) adaptation and symbol and frame timing synchronization. Chirp signal is used as a preamble 202 because it is a low PAR (peak power to average ratio) and has very good auto correlation characteristics. It should be noted that any low PAR signal with good correlation characteristic can be used as the preamble. Also, the preamble 202 is using the initial phase reference being used for the first symbol in a header 204. After that each symbol is coded based on the preceding symbol. The coding of signal is performed to provide the header 204. The OFDM system includes a checksum calculation and insertion block 206. It overwrites the last two bytes of the header with a 16-bit CRC (cyclic redundancy check) calculated over the contents of the symbols.

Figure 3:
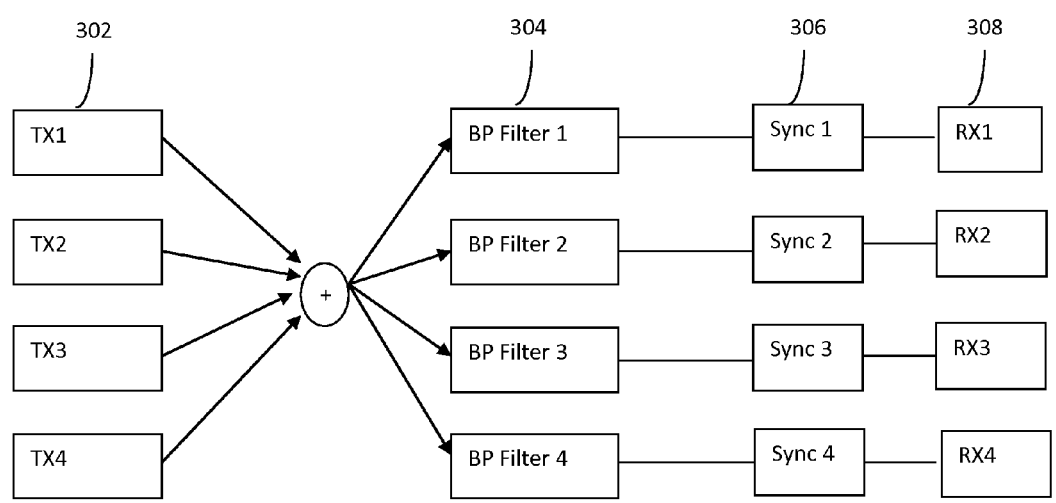
FIG. 3 shows a general redundancy scheme in NOFDM transmission in accordance with an embodiment of the present invention.

FIG. 3 shows a general redundancy scheme in NOFDM transmission in accordance with an embodiment of the present invention. The general redundancy scheme is illustrated wherein 4 independent data signals are transmitted through a transmitter 302. These data signals are fed to a device, where modulation and inverse fast Fourier transformation are performed. The modulated signals are separated and then passed through the band-pass filters 304. The band-pass filter removes the noise and out of band interference signals. The signals from the band-pass filter are fed to the corresponding synchronizers 306. The synchronized signals are received through the corresponding receivers 308.

The general redundancy scheme has the potential to perform all kinds of diversity schemes on the receiver 308 such as simple receiver diversity and maximum ratio combining Different matrices can be used to derive decision making on the receiver combining.

Figure 4:
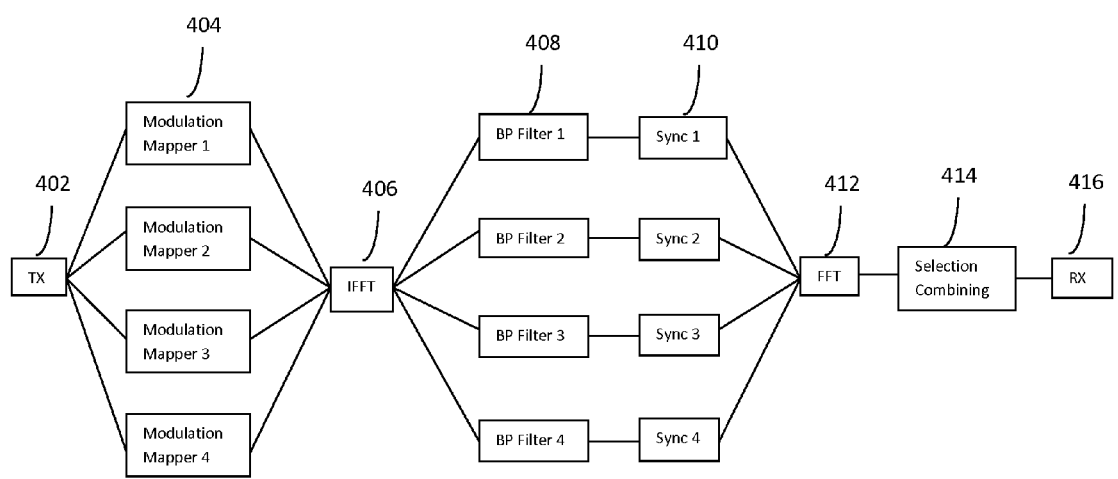
FIG. 4 illustrates a NOFDM system for transmitting signal through a transmitter in accordance with an embodiment of the present invention.

FIG. 4 illustrates a NOFDM system for transmitting a data through a transmitter in accordance with an embodiment of the present invention using traditional OFDM as the underlying scheme. The NOFDM herein utilizes the redundancy mode, where the communication channel having a frequency region in range of 500 kHz is divided into a plurality of sub-channels with non-overlapping sub-frequency region. The data having a bandwidth of 50 kHz to 100 kHz is encoded on completely programmable non-overlapping sub-frequency regions of a communication channel by a modulating mapper 404. The modulating mapper uses a modulation technique for encoding the data over the sub-frequency carrier region. The parameters are essentially the starting independent sub-carriers with independent respective preambles. IFFT is performed on the modulated data at stage 406. The data in each of the plurality of sub-frequency regions is subjected to a separate programmable band pass filter 408 meant for the corresponding sub-frequency region, to enhance the detectability of a narrowband preamble. A dedicated synchronizer 410 is used for enhancing the performance of time domain synchronizers. Multiple numbers of synchronizers 410 are present in the transceiver system, each dedicated for a specific sub-frequency region. Fast Fourier transformation (FFT) of sub-frequency regions are performed in step 412. Based on the scheme used for the transmission of data over the communication channel, selection combining is performed at step 414. If the data is transmitted in redundant mode, where multiple copies of same data are transmitted on different sub-frequency regions of sub-channels, the data are combined to derive different metrics of information. If the data is transmitted in aggregate mode, where different data are transmitted over the sub-frequency regions of the sub-channel, after FFT the data are merged to yield the collective information.

In an embodiment of the present invention, the modulation technique can be differential or coherent and includes XPSK (cross-correlated phase-shift keying), BPSK, QPSK, 8PSK or 16QAM (quadrature amplitude modulation).

In an embodiment of the present invention the data can be transmitted in aggregate mode or in redundancy mode. In redundant mode, all types of diversity schemes can be performed at the receiver (RX) end, such as simple RX selection diversity or maximum ratio combining.

In a redundant mode, the same data is encoded on multiple sub-frequency regions of a communication channel. Transmitting the same data on multiple sub-channels increases the robustness of receiving data by employing diversity schemes.

In the channel combining diversity redundancy mode, the receiver partially or fully demodulates all sub-channels to perform RX diversity and maximum ratio combining to combine the information from multiple channels (on a sample by sample or symbol by symbol basis) to maximize the ability to receive the transmitted data. Different metrics can be used to derive decision making on the combining Different sub-channels can be assigned different weights in the process of combining. The various modes enable trade-off between higher data rate and robustness depending on channel conditions and the complexity of the receiver.

In an embodiment of the present invention, the synchronizer correlator scores and/or RSSI of sub-channels are used to weight the sub-channels' data before combining.

Alternatively, in the channel selection diversity redundancy mode only single channel out of the redundant channels is demodulated at the receiver end. The selection of the sub-channel to demodulate can be performed by considering the data quality available on all the corresponding redundant sub-channels (sub-channels RSSI or correlator scores where multiple correlators are available can provide data quality metric). Since the same data is transmitted over the multiple sub-channels, a single synchronizer 410 can be used at the receiver end for time domain synchronization. At the selection combining stage 414, the data on different sub-channels can be interpreted to generate metrics of information. These metrics can be used to derive decision making on combining or selecting.

In the aggregate mode, different data is transmitted over different sub-channels and data is having separate preamble and header in each sub-channel. Since different data is carried on different sub-channels, therefore the data rate is maximized while using a viable portion of spectrum. A dedicated band pass filters 408 and synchronizers 410 for each sub-channel are used to enhance the performance of the time domain synchronizer. The programmable band pass filter 408 is utilized prior to the synchronizer 410 to maximize the detectability of the narrow band preamble. The band pass filter 408 serves to increase the SINR of the signal processed by the universal synchronizer 410 by minimizing out of band noise. As the signal that is sent to the FFT engine is not subjected to the same narrowband, band pass filtering it is possible to still utilize other frequency bands when the channel is not "spectrally compromised".

The scheme can operate in a "mixed mode" where some sub-channels are redundant, while others are aggregated.

Figure 5:
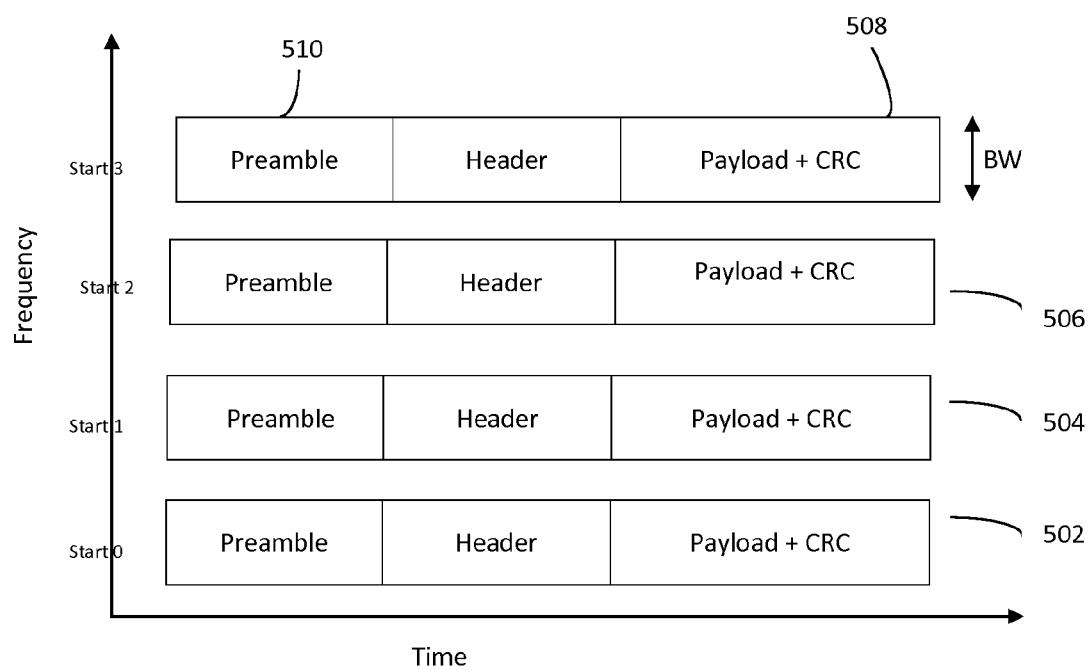
FIG. 5 illustrates a spectral view of a NOFDM signal transmission in accordance with an embodiment of the present invention.

FIG. 5 illustrates a spectral view of a NOFDM signal transmission in accordance with an embodiment of the present invention. The bandwidth is divided into four sub-channels that are completely independent are start0 502, start1 504, start2 506 and start3 508. Each sub-channel is having its own channel bandwidth and a separate preamble. For instance the independent sub channel 508 provided with an independent bandwidth and a separate preamble 510. The width of each multiple channel typically range from 50-100 kHz, but can be assigned any other ranges. As there are four sub channels, they can be transmitted with redundancy NOFDM transmission or in aggregated NOFDM transmission system. In redundant transmission initial phases can be different or the same. When same initial phases are used, the system replicating the data at the input of the IFFT which makes the implementation much simpler. The implementation equivalent to four functionally independent modems. All these channels are completely independent. The significance of the redundant NOFDM system is that each copy is coming from a different frequency sub-channel and it increases the chances of detection in extremely harsh channels. The signals can be transmitted in plurality of independent sub-channels.

Figure 6:
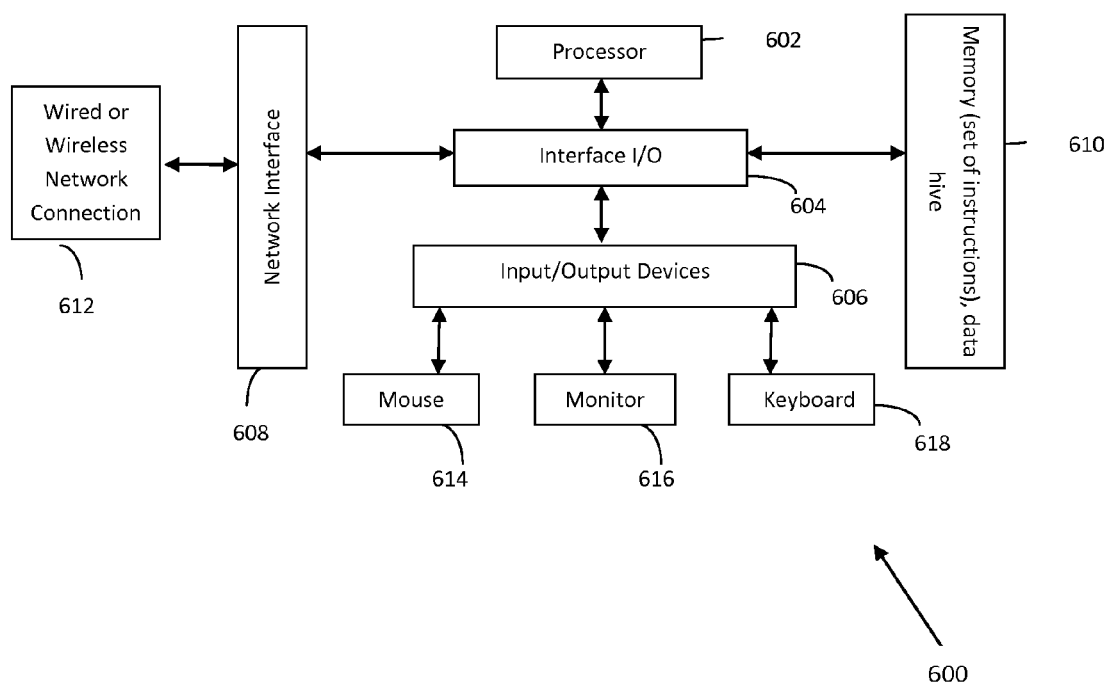
FIG. 6 is a block diagram of a computer system which is configured to implement the system and method described here to some embodiments.

FIG. 6 is a block diagram of a computer system which is configured to implement the system and method described here to some embodiments.

As noted above, embodiments of systems and methods for a NOFDM system may be implemented or executed by one or more computer systems. One such system is illustrated in FIG. 6. In various embodiments, system 600 may be a system, server, a workstation, a network computer, a desktop computer, a laptop, mobile device, or the like. In different embodiments, these various systems may be configured to communicate with each other in any suitable way. The computer system 600 includes single or plurality of processors 602 associated with a memory/data hive 610 through the I/O (input/output) device 606. The computer system 600 further includes the I/O devices such as but not limited to mouse 614, monitor 616 (display device) and keyboard 618. The computer system 600 can be a multiprocessor system. Processor 602 is capable of executing instructions and can be a general purpose processor or can be an embedded processor that is capable of implementing a variety of instructions.

The data hive or memory 610 is coupled and configured to the processor via the I/O interface 604 to store the program instructions and data which can be accessed by the processor 602. The memory can be volatile, non volatile, flash type memory or any other type of memory. The Interface I/O 604 may be acting as a coordinating medium for the I/O traffic between processor 602, data hive or memory 610, peripheral devices which can include all the input/output devices or other networked devices or interface. The network Interface 608 allows the data communication to outgoing networks via wired or wireless network connection 612. All the conversion of data into suitable format can be converted by the processor 602.

Input/output devices 606 may include keyboards, mouse 614, key pads, monitors 716, display or any other devices to interact with the system form desired operation. There can be a possibility of having multiple input/devices. The memory 610 may include a set of instructions to perform the desired operation as for e.g. to transmit the data over a power line on a narrowband channel. The set of instructions can be written in various programming languages or scripting languages, for example, Java, Perl, COBOL (Common Business-Oriented Language), JavaScript, C, and C++ and like. The data hive can also be called as data storage facility where the data related to the various operations or data for reference or any data which is related to the different operations can be stored. The computer system is merely illustrative and is not intended to limit the scope of the disclosure described herein.

It will be understood that the invention described herein can be performed in any order and can be performed once or repeatedly. Various operations described herein may be implemented in hardware, software, firmware and/or any combination thereof. It is to be understood by the person skilled in the art that the illustrations in Figures describes the invention in the best possible ways and are not limiting the scope of the invention.

We claim:

1. A method for transmitting data through a communication channel in a narrowband orthogonal frequency-division multiplexing system comprising:
    dividing the communication channel into a plurality of sub-channels, each sub-channel having non-overlapping sub-carrier frequency regions with an initial phase used to generate a preamble and encode a header;
    modulating the data on the sub-carrier frequency regions and transmitting a copy of the same data on each of the plurality of sub-channels;
    passing the modulated sub-carrier frequency regions at a receiver end through a filter and a synchronizer; and
    selecting a sub-channel at the receiver end and demodulating the sub-carrier frequency regions of the selected sub-channel.

2. The method of claim 1 wherein the preamble is a signal with a low peak to average power ratio such as a chirp signal.

3. The method of claim 1 wherein the modulation comprises coherent modulation or differential modulation.

4. The method of claim 1 wherein each of the plurality of sub-channels has same initial phase.

5. The method of claim 1 wherein the fast Fourier transform size and preamble size of the modulated data are 256 or 512 bits.

6. The method of claim 1 wherein the communication channel is a wireless or wire channel.

7. A method for transmitting data through a communication channel in a narrowband orthogonal frequency-division multiplexing system comprising:
    dividing the communication channel into a plurality of sub-channels, each sub-channel having non-overlapping sub-carrier frequency regions with an initial phase used to generate a preamble and encode a header;
    modulating the data on the sub-carrier frequency regions and transmitting a copy of the same data on each of the plurality of sub-channels;
    passing the modulated sub-carrier frequency regions through a plurality of bandpass filters and synchronizers, wherein each of the sub-carrier frequency regions is passed through the corresponding bandpass filter and synchronizer;
    demodulating the sub-carrier frequency regions of each of the plurality of sub-channels; and
    combining the demodulated sub-carrier frequency regions of the sub-channels at a receiver end.

8. The method of claim 7 wherein the preamble is a signal with a low peak to average power ratio such as a chirp signal.

9. The method of claim 7 wherein the modulation comprises coherent modulation or differential modulation.

10. The method of claim 7 wherein each of the plurality of sub-channels has same initial phase.

11. The method of claim 7 wherein the sub-channels are weighted before combining.

12. The method of claim 7 wherein the fast Fourier transform size and preamble size of the modulated data are 256 or 512 bits.

13. The method of claim 7 wherein the communication channel is a wireless or wire channel.

14. A method for transmitting data through a communication channel in a narrowband orthogonal frequency-division multiplexing system comprising:
    dividing the communication channel into a plurality of sub-channels, each sub-channel having non-overlapping sub-carrier frequency regions with an initial phase used to generate a preamble and encode a header;
    modulating the data on the sub-carrier frequency regions and transmitting different data on each of the plurality of sub-channels;
    passing the modulated sub-carrier frequency regions through a plurality of bandpass filters and synchronizers, wherein each of the sub-carrier frequency regions is passed through the corresponding synchronizer;
    demodulating the sub-carrier frequency regions of each of the plurality of sub-channels; and concatenating the demodulated sub-carrier frequency regions of the sub-channels at a receiver end.

15. The method of claim 14 wherein the preamble is a signal with a low peak to average power ratio such as a chirp signal.

16. The method of claim 14 wherein the modulation comprises coherent modulation or differential modulation.

17. The method of claim 14 wherein the fast Fourier transform size and preamble size of the modulated data are 256 or 512 bits.

18. The method of claim 14 wherein the communication channel is a wireless or wire channel.

* * * * *